Oct. 23, 1945.  W. A. WILDENHEIN  2,387,696
POWER TRUCK AND PROPULSION MEANS THEREFOR
Filed April 28, 1944    2 Sheets-Sheet 1

Inventor
WILLIAM ALBERT WILDENHEIN,
By
Attorneys

Oct. 23, 1945. W. A. WILDENHEIN 2,387,696
POWER TRUCK AND PROPULSION MEANS THEREFOR
Filed April 28, 1944  2 Sheets-Sheet 2

Inventor
WILLIAM ALBERT WILDENHEIN,

By Clarence A. O'Brien
and Harvey B. Jacobson
Attorneys

Patented Oct. 23, 1945

2,387,696

UNITED STATES PATENT OFFICE 2,387,696

POWER TRUCK AND PROPULSION MEANS THEREFOR

William Albert Wildenhein, Elyria, Ohio

Application April 28, 1944, Serial No. 533,176

2 Claims. (Cl. 105—119)

This invention relates to a novel and structurally improved power truck which is expressly, but not necessarily, adapted for use in the so-called "model railroad field."

The outstanding purpose of the invention is to provide a more powerful and reliable mode of motion transmission between a prime mover or electric motor and conventional flanged track engaging wheels, the preferred embodiment being characterized by steadiness in the driving action, improved use of principles of mechanical movements to insure a more powerful drive, this being accomplished by a structural arrangement which is sufficiently flexible and adaptable to enable it to serve as a nucleus around which to build motor supports, side frames and other complemental locomotive parts.

In carrying out the preferred principles of the invention, I have evolved and produced a unique selection and assemblage of mechanical elements, the desired mechanical advantages being derived from a multipled screw action arrangement which constitutes the power or motion transmission means between the prime mover and flanged wheels.

More specifically, the invention is characterized by a simple, sturdy wheel supported chassis or frame, the frame constituting a gear box or housing and this encompassing and accommodating the novel multiple shaft worm drive and companion bearings and adjustments for said bearings.

Other features and advantages will become more readily apparent from the following description and the accompanying illustrative drawings.

In the drawings, wherein like numerals are employed to designate like parts throughout the same:

Broadly, the assemblage is characterized by a frame or chassis with horizontal parallel wheel supporting and propelling axles, fore and aft stub or driven shafts having operating connections with said axles, and a main motion transmitting shaft having operating connections for simultaneously driving the stub-shafts.

Figure 4:
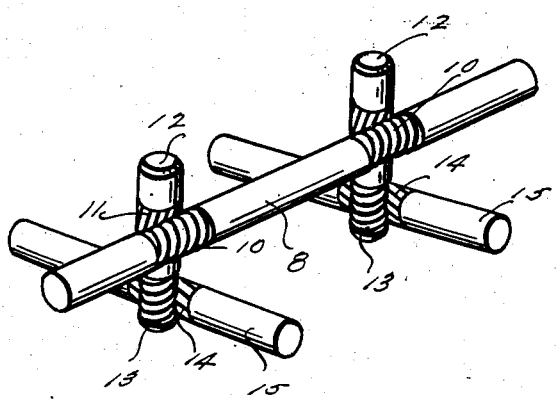
Figure 4 is a perspective view showing the drive shaft, driven shafts and associated wheel axles.

The chassis frame is in the form of a bronze cast gear box or housing 5 of approximate rectangular form, the upper side thereof being closed by a cover plate 6 appropriately fastened in place. The front and rear walls of the box are provided with bearings 7 for end portions of the horizontal drive shaft 8. End thrust collars are secured by set-screws to the shaft portions within the housing, the collars being denoted by the numeral 9 and there being anti-friction balls arranged between said collars and bearings to provide the desired adjustable free-rotating supports for the shaft 8. Inwardly of the collars the shaft 8 is provided with longitudinally spaced drive worms or screws 10. As brought out to advantage in Figure 4 these worms mesh with coacting worms 11 on the intermediate portions of the perpendicular power take-off or driven stub-shafts 12. The shafts 12 are provided at their lower ends with additional worms 13 emmeshed with coacting worm gears 14 on the intermediate portions of the fore and aft horizontal axles 15. The axles are journaled for rotation in bearings in the side walls of the frame and are provided with the usual track engaging flanged wheels 16.

Figure 1:
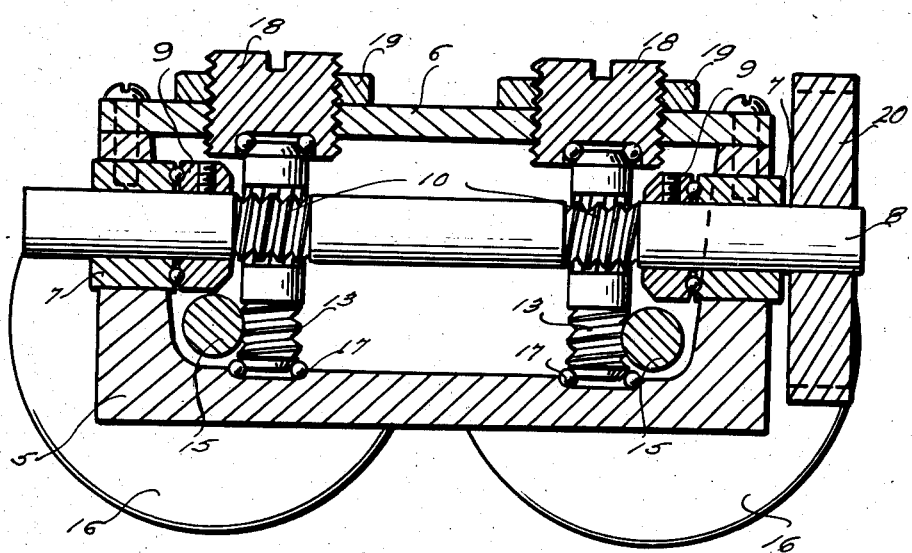
Figure 1 is a substantially central longitudinal sectional view, taken on the plane of the line 1—1 of Figure 3, the drive and driven shafts appearing in elevation.
Figure 2:
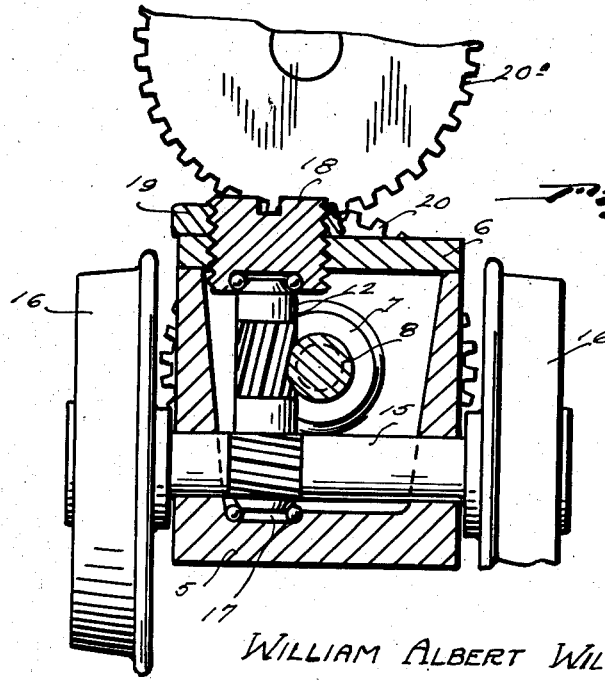
Figure 2 is a central transverse section through Figure 1 looking in a direction from left to right.
Figure 3:
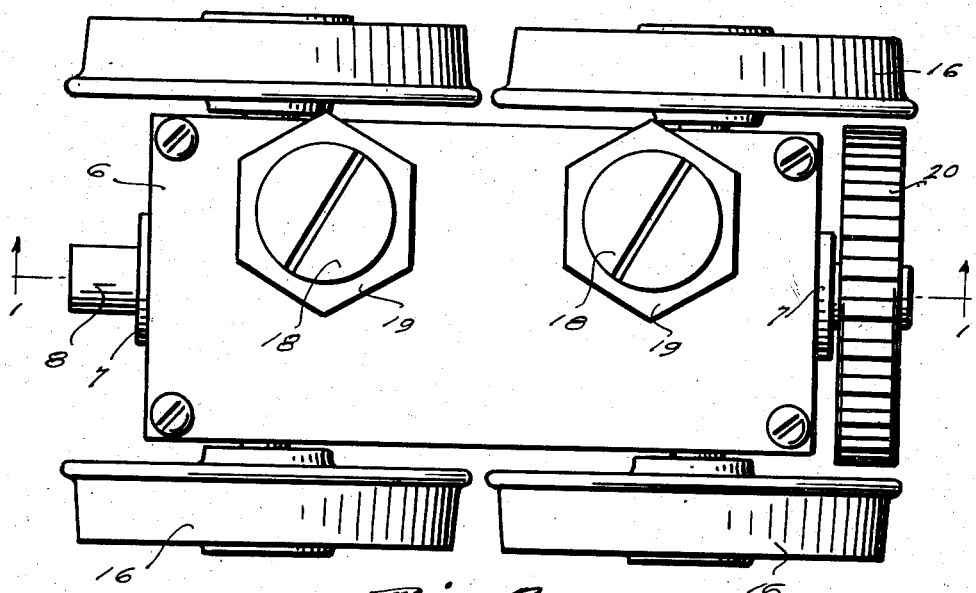
Figure 3 is a top plan view disclosing the entire truck unit, this on an enlarged scale which is approximately twice the actual or full size of the device as used.

The drive shaft 8 passes through the central longitudinal median portion of the gear-box and the perpendicular driven shafts 12 are offset to one side and the lower ends thereof are beveled and rest upon suitable ball race arrangements fashioned in the bottom of the gear-box. Each arrangement is a simple socket containing anti-friction balls 17, as shown to advantage in Figures 1 and 2. The upper ends of the shafts 12 are also tapered or beveled and are received in ball-equipped recesses formed in the end-thrust adjustable plugs 18 threaded through openings in the cover plate 6. The numerals 19 designate lock nuts for said screw-plugs. The power transmitting or propulsion gear 20 on the forward end of the shaft 8 derives power from a complemental gear 20a which may be the gear on the prime mover, electric motor or other source of power (not shown).

This power truck is, as before briefly mentioned, a means or device to transfer and transmit power from an electric motor through a series of gears to four drive wheels of a model locomotive. It has the following advantages: By use of a dual worm drive, the unit will be considerably more powerful than existing types. The existing types are single worm gear, spur gear, sprocket and chain drives or combinations thereof. They are obtainable only in low gear ratios or about 15:1. However, this improved unit can be constructed with ratios as high as 40:1 or possibly even higher. Therefore, scale model locomotives equipped with this power truck will be able to tug and pull much heavier loads. The all-ball bearing feature is desirable from the standpoint of smooth transmission of motion, as well as ease of mechanical adjustment to compensate for end play, end thrust, and wear of shafts and bearings. The design is, furthermore, well adapted for simplicity of production. It is constructed around a cast bronze, or other material, frame which is drilled and reamed to receive the shafts or pinions. The cast frame also serves as a support for the motor and the side frames or that part of the prototype which holds journal boxes, springs, etc.

A cast frame arrangement will allow a much sturdier and heavier construction than is usually found on similar units. Furthermore, it places more weight lower than other units; resulting in a lower center of gravity in the completed model. Furthermore, it can be made to receive a flexible drive from the motor directly to shaft 8 (as per drawings) allowing the motor to be mounted in the locomotive proper. This will allow use of a fairly large motor in the smaller gauges of models such as OO or HO (¾" and ⅝" gauge respectively). Usually these smaller gauge locomotives will not permit installation of a large motor when attached directly to the power unit. There are no units, to my knowledge, which have this external drive feature.

Summing it up, I may say that from my experience in the model railroad field, no power truck exists which provides such a powerful drive, such a flexible type to build around, and one which will provide as long a life as I expect of this design.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A miniature type power truck for model locomotives and the like comprising a gear box, horizontal wheel axles mounted for rotation in bearings in the side walls of said gear box, flanged wheels on the outer ends of said axles, the intermediate portions of the axles being provided with worm gears, bearings in the front and rear ends of said gear box, a drive shaft mounted for rotation in said bearings, thrust collars on the drive shaft located within the gear box, ball bearings interposed between the thrust collars and adjacent bearings, said drive shaft being provided adjacent opposite ends and within the limits of the gear box with longitudinally spaced worm gears, bearing pockets in the bottom of the gear box, said gear box having a removable lid, said lid being provided with adjustable plugs having bearings fashioned therein, and power take-off driven shafts having their opposite ends confined within the gear box and located in the respective and coacting bearings, said driven shafts having worm gears at their lower ends coacting with the worm gears on said axles, and worm gears intermediate their ends in mesh with the worm gears on said drive shaft.

2. In a power take-off device, a gear box, an anti-friction thrust bearing at each end of the gear box, a drive shaft journaled in the gear box and held against longitudinal displacement by the anti-friction thrust bearings, at least one worm on the drive shaft within the confines of the gear box, at least one driven shaft wholly within the confines of the gear box, an anti-friction thrust bearing carried by the gear box and supporting one end of the driven shaft, an anti-friction thrust bearing supporting the opposite end of the driven shaft, a screw plug entering the gear box and adjustably supporting the second mentioned anti-friction thrust bearing, a worm gear on the driven shaft meshing with the worm on the drive shaft, an axle journaled in the gear box at least one end of which extends beyond the confines of the gear box, a worm gear on the axle within the confines of the gear box, and a worm on the driven shaft meshing with the worm gear on the axle.

WILLIAM ALBERT WILDENHEIN.